(12) United States Patent
Nakanishi et al.

(10) Patent No.: US 11,989,311 B2
(45) Date of Patent: May 21, 2024

(54) MAGNETIC DISK DEVICE AND METHOD OF CHANGING KEY GENERATION OF CRYPTOGRAPHIC KEY

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hironori Nakanishi, Yokohama Kanagawa (JP); Kana Furuhashi, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 202 days.

(21) Appl. No.: 17/470,262

(22) Filed: Sep. 9, 2021

(65) Prior Publication Data

US 2022/0300622 A1 Sep. 22, 2022

(30) Foreign Application Priority Data

Mar. 19, 2021 (JP) .................. 2021-045391

(51) Int. Cl.
| | |
|---|---|
| *H04L 9/08* | (2006.01) |
| *G06F 12/14* | (2006.01) |
| *G06F 21/60* | (2013.01) |
| *G06F 21/78* | (2013.01) |
| *G06F 12/0873* | (2016.01) |
| *H04L 9/16* | (2006.01) |

(52) U.S. Cl.
CPC ........ *G06F 21/602* (2013.01); *G06F 12/1408* (2013.01); *G06F 12/1425* (2013.01); *G06F 21/78* (2013.01); *H04L 9/0861* (2013.01); *H04L 9/0891* (2013.01)

(58) Field of Classification Search
None
See application file for complete search history.

(56) References Cited

U.S. PATENT DOCUMENTS

| | | | |
|---|---|---|---|
| 8,356,184 B1 * | 1/2013 | Meyer .................. | G06F 21/79 711/100 |
| 8,422,677 B2 * | 4/2013 | Kitamura .............. | G06F 21/80 707/831 |

(Continued)

FOREIGN PATENT DOCUMENTS

| | | |
|---|---|---|
| JP | H11265349 A | 9/1999 |
| JP | 2020150497 A | 9/2020 |

OTHER PUBLICATIONS

KEY-SSD: Access-Control Drive to Protect Files from Ransomware Attacks. Ahn. (Year: 2019).*

(Continued)

*Primary Examiner* — Venkat Perungavoor
(74) *Attorney, Agent, or Firm* — Kim & Stewart LLP

(57) ABSTRACT

According to one embodiment, a magnetic disk device includes a disk, a head writing data to the disk and reading data from the disk, and a controller managing a key generation of a cryptographic key, based on generation confirmation information which is generated by the cryptographic key managed by an external device and transferred from the external device, and which is unable to generate the cryptographic key.

16 Claims, 9 Drawing Sheets

(56) References Cited

U.S. PATENT DOCUMENTS

2015/0324281 A1* 11/2015 Takefman ........... G06F 12/0246
              711/103
2019/0362081 A1  11/2019 Kanno
2020/0225882 A1*  7/2020 Li ....................... G06F 12/0246
2020/0293206 A1   9/2020 Isozaki et al.

OTHER PUBLICATIONS

SSD-Insider: Internal Defense of Solid-State Drive against Ransomware with Perfect Data Recovery. Baek. IEEE. (Year: 2018).*

* cited by examiner

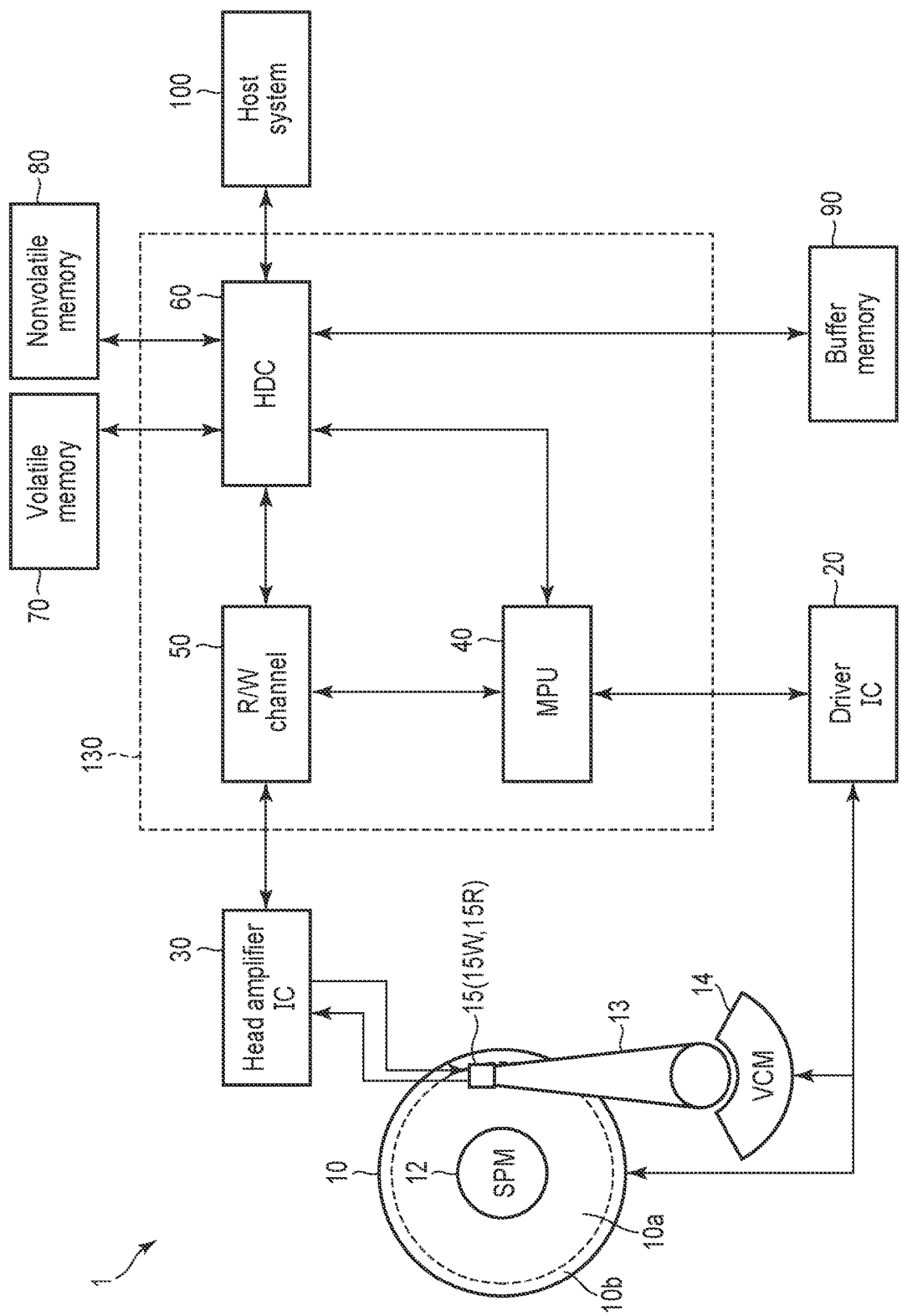
F I G. 1

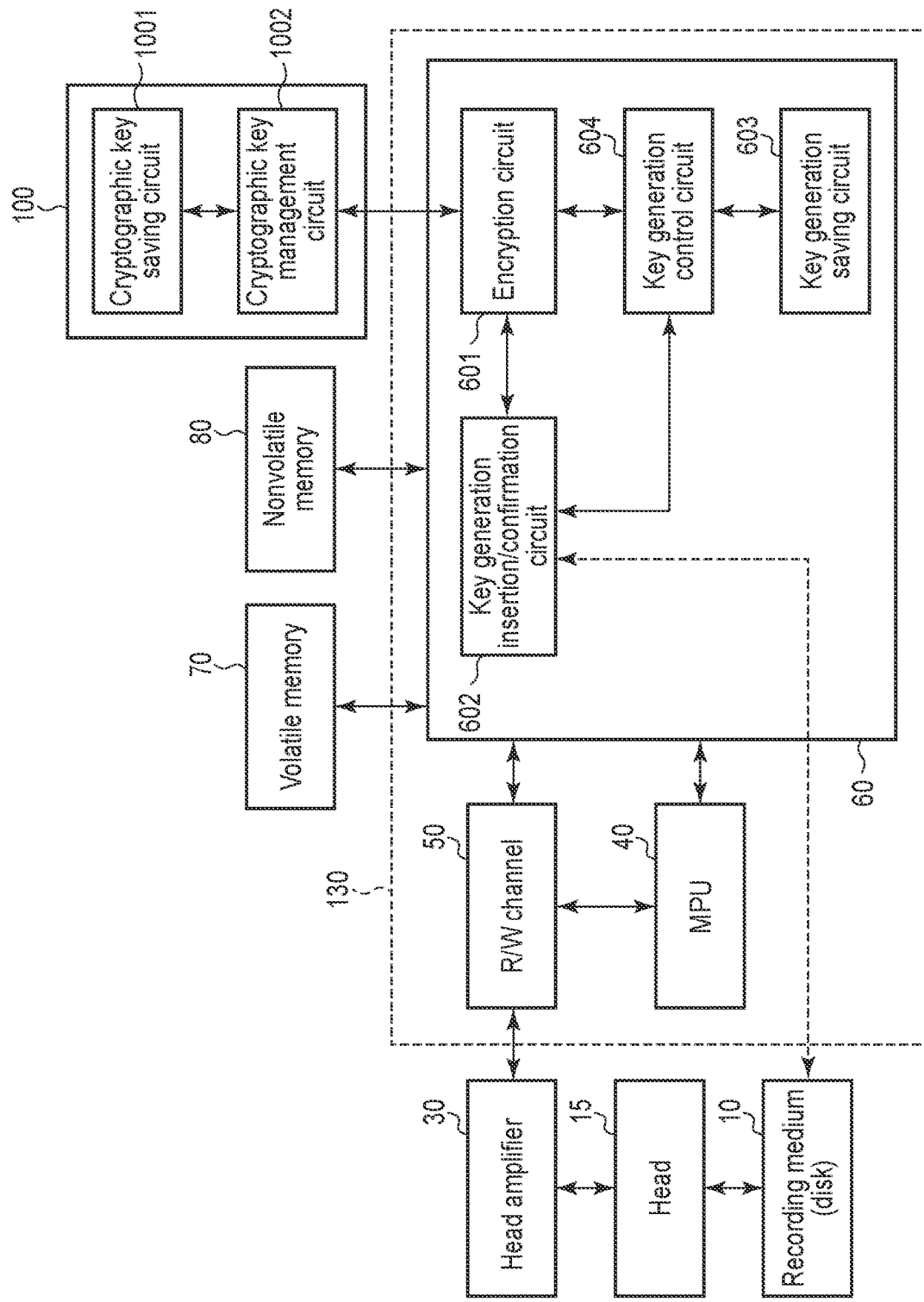
F I G. 2

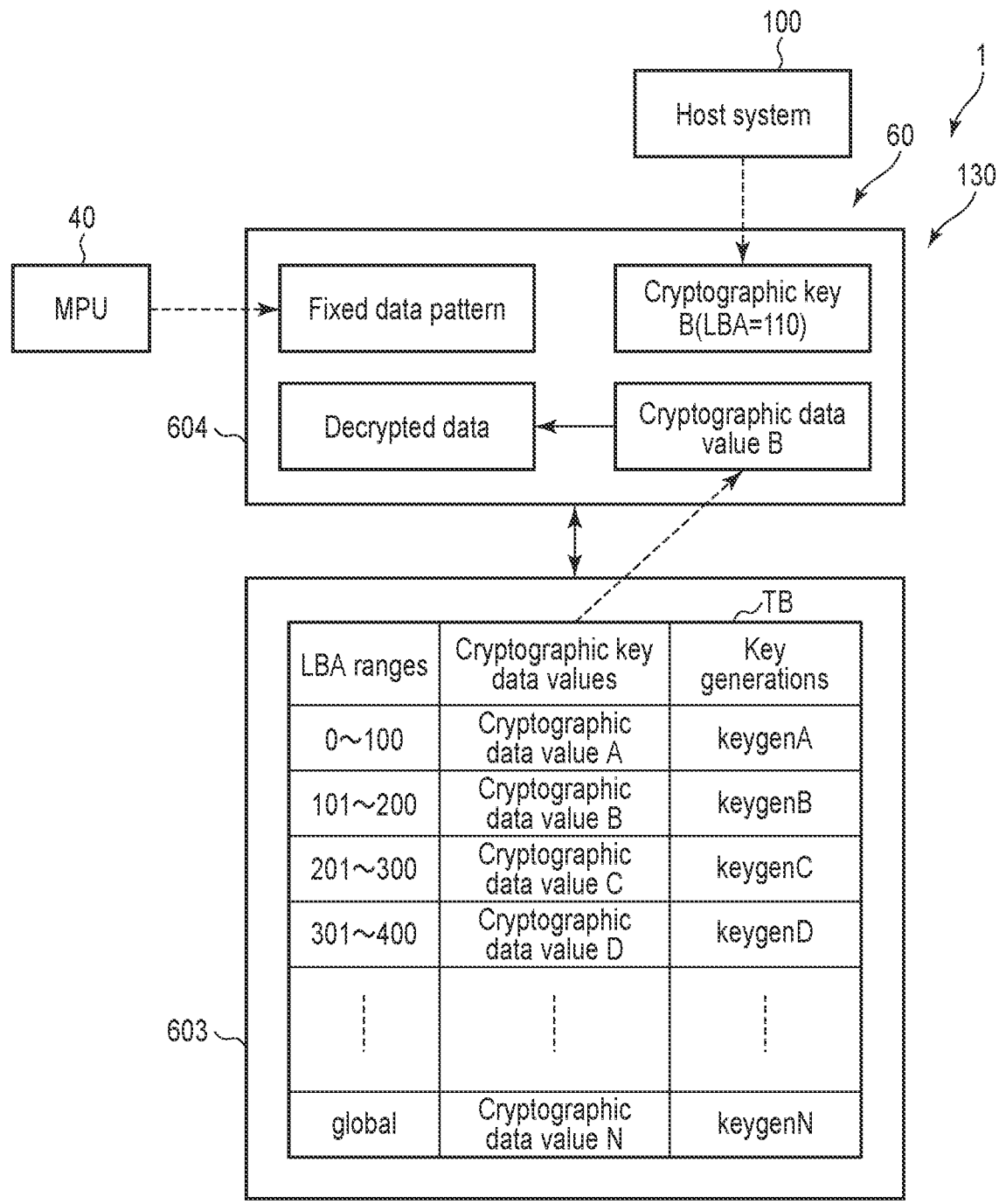
F I G. 3

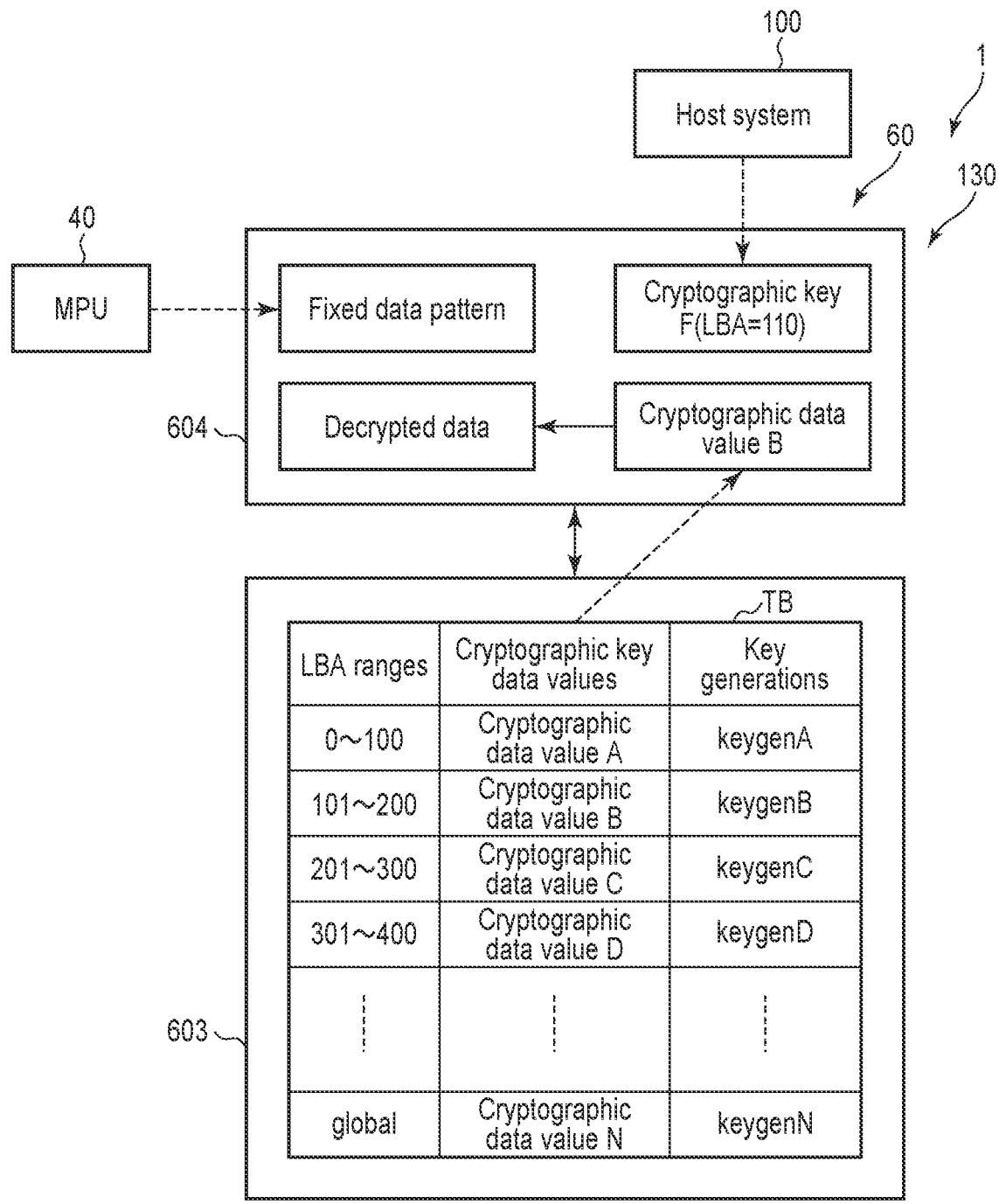
F I G. 4

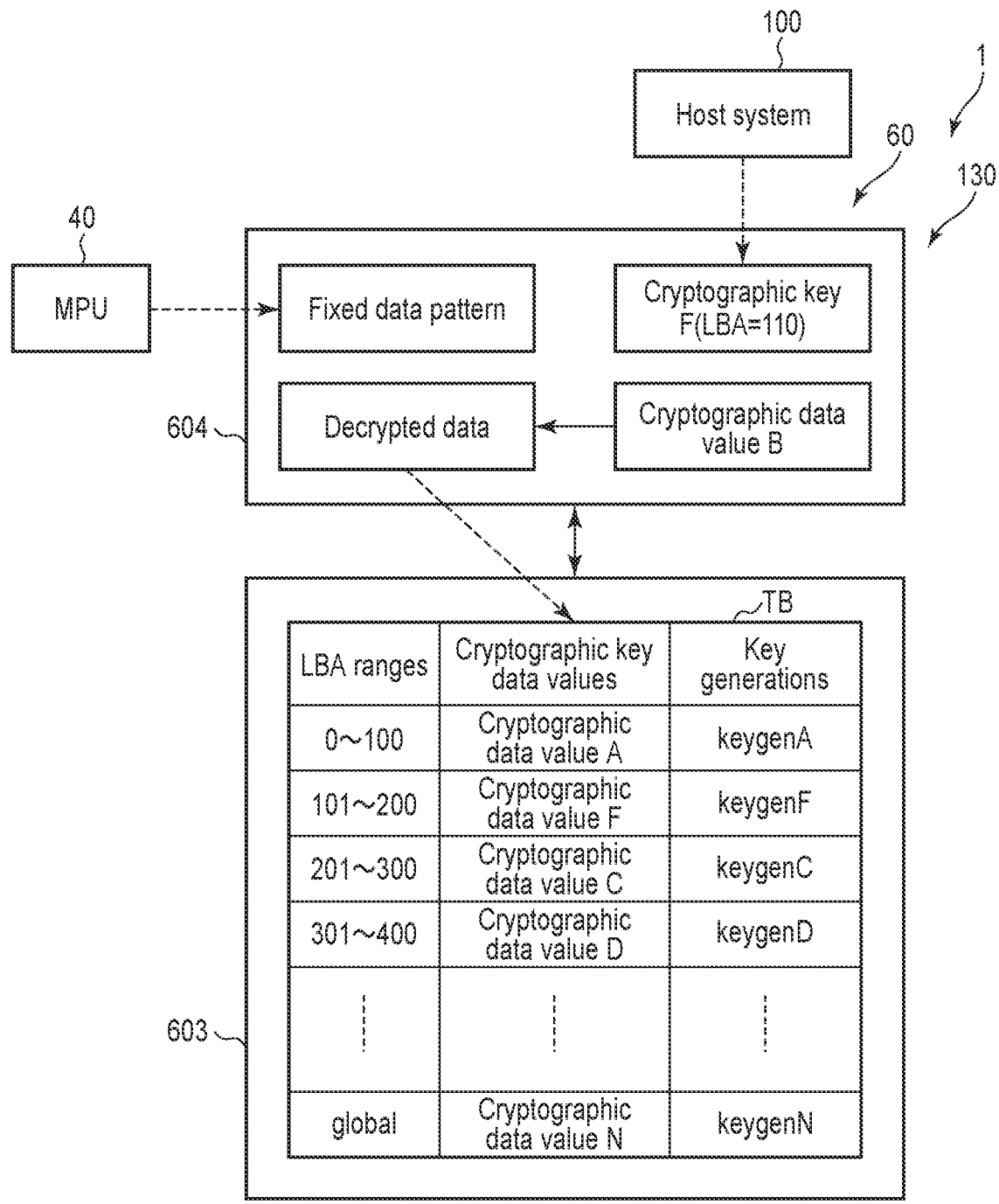
F I G. 5

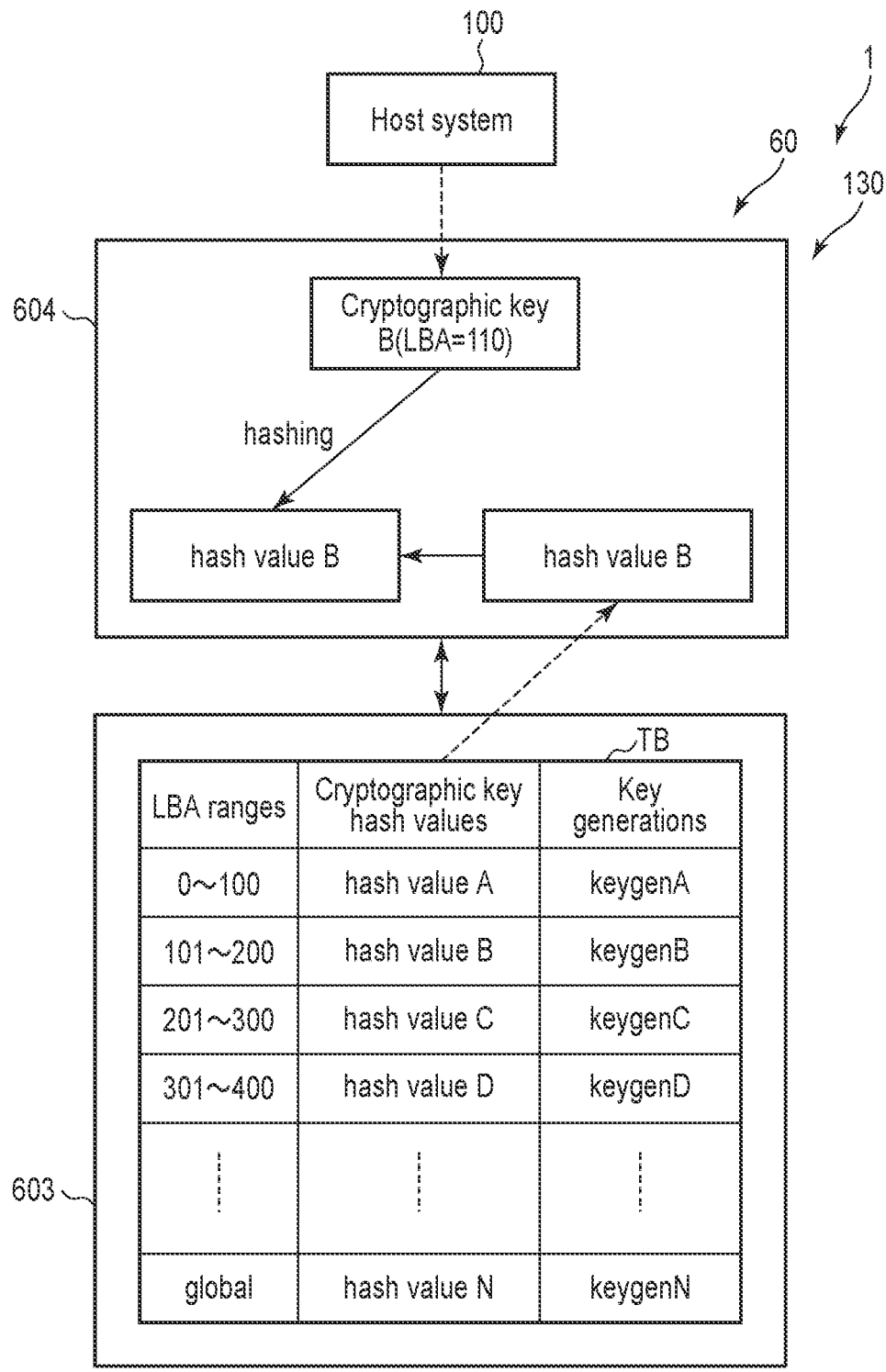
F I G. 7

MAGNETIC DISK DEVICE AND METHOD OF CHANGING KEY GENERATION OF CRYPTOGRAPHIC KEY

CROSS-REFERENCE TO RELATED APPLICATIONS

This application is based upon and claims the benefit of priority from Japanese Patent Application No. 2021-045391, filed Mar. 19, 2021, the entire contents of which are incorporated herein by reference.

FIELD

Embodiments described herein relate generally to a magnetic disk device and a method of changing a key generation of a cryptographic key.

BACKGROUND

In general, magnetic disk devices generate and manage cryptographic keys for encrypting and decrypting data. In recent years, in order to increase security, magnetic disk devices that process data encrypted and decrypted by cryptographic keys generated and managed by external devices such as hosts have been considered.

BRIEF DESCRIPTION OF THE DRAWINGS

FIG. 1 is a block diagram showing a configuration of a magnetic disk device 1 according to embodiments.

FIG. 2 is a block diagram showing configuration example of an HDC and a host according to the embodiments.

FIG. 3 is a schematic diagram showing an example of a method of updating a key generation of a cryptographic key in a particular LBA range according to the embodiments.

FIG. 4 is a schematic diagram showing an example of the method of updating the key generation of the cryptographic key in the particular LBA range according to the embodiments.

FIG. 5 is a schematic diagram showing an example of the method of updating the key generation of the cryptographic key in the particular LBA range according to the embodiments.

FIG. 7 is a schematic diagram showing an example of the method of updating the key generation of the cryptographic key in the particular LBA range according to the embodiments.

DETAILED DESCRIPTION

Figure 6:
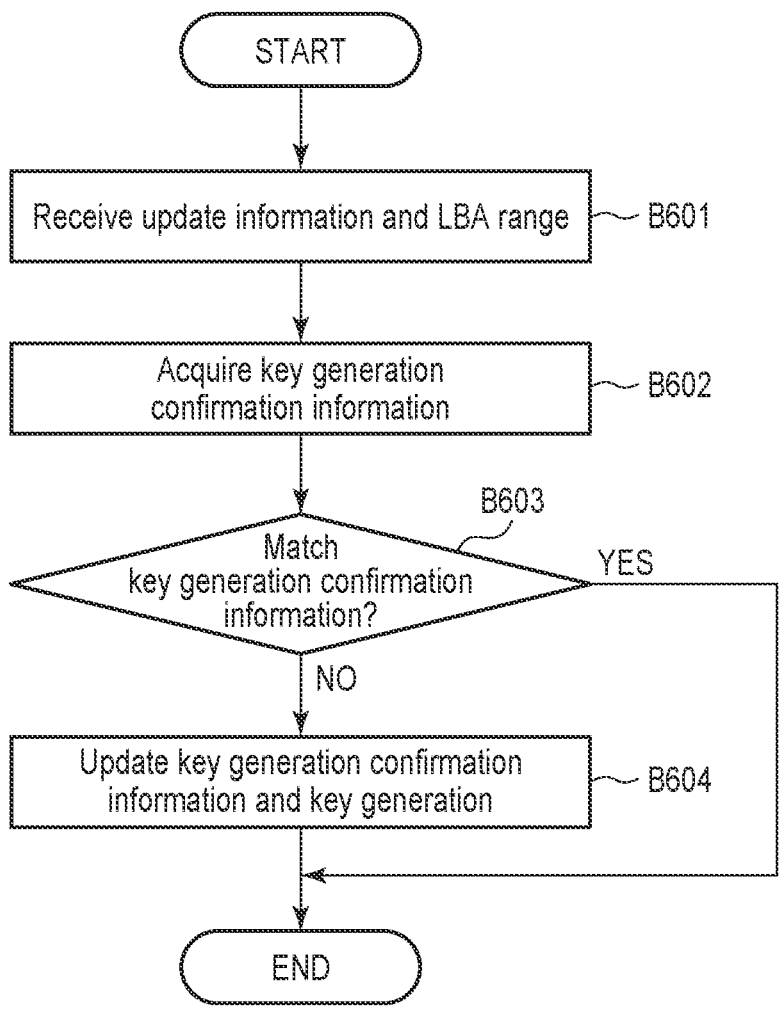
FIG. 6 is a flowchart showing an example of the method of updating the key generation of the cryptographic key according to the embodiments.

In general, according to one embodiment, a magnetic disk device comprises: a disk; a head writing data to the disk and reading data from the disk; and a controller managing a key generation of a cryptographic key, based on generation confirmation information which is generated by the cryptographic key which managed by an external device and transferred from the external device, and which is unable to generate the cryptographic key.

Embodiments will be described hereinafter with reference to the accompanying drawings. The drawings are only examples and do not limit the scope of the invention.

EMBODIMENTS

FIG. 1 is a block diagram showing a configuration of a magnetic disk device 1 according to embodiments.

The magnetic disk device 1 includes a head disk assembly (HDA) to be described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 that is a 1-chip integrated circuit. In addition, the magnetic disk device 1 is connected to an external device, for example, a host system (host) 100.

The HDA includes a magnetic disk (hereinafter referred to as a disk) 10, a spindle motor (SPM) 12, an arm 13 on which a head 15 is mounted, and a voice coil motor (VCM) 14. The disk 10 is attached to the spindle motor 12 to rotate by the drive of the spindle motor 12. The arm 13 and the VCM 14 constitute an actuator. The actuator controls the movement of the head 15 mounted on the arm 13 to a particular position on the disk 10 by the drive of the VCM 14. Two or more of the disks 10 and the heads 15 may be provided.

The disk 10 is assigned a user data area 10a and a system area 10b where information necessary for system management is written, in the recording area. In addition to the user data area 10a and the system area 10b, the disk 10 may be allocated a media cache (hereinafter referred to as a media cache area) where data (or commands) transferred from the host 100, or the like are stored before written to a particular area of the user data area 10a. A direction from the inner circumference to the outer circumference of the disk 10 or a direction from the outer circumference to the inner circumference of the disk 10 is hereinafter referred to as a radial direction. In the radial direction, a direction from the inner circumference to the outer circumference is referred to as an outward direction (or outside), and a direction from the outer circumference to the inner circumference, that is, a direction opposite to the outward direction is referred to as an inward direction (or inside). A direction perpendicular to the radial direction of the disk 10 is referred to as a circumferential direction. That is, the circumferential direction corresponds to the direction along the circumference of the disk 10. In addition, a particular position of the disk 10 in the radial direction may be referred to as a radial position, and a particular position of the disk 10 in the circumferential direction may be referred to as a circumferential position. The radial position and the circumferential position may be collectively referred to simply as a position. The disk 10 is classified into a plurality of areas (hereinafter referred to as zones or zone areas) for respective particular ranges of the radial direction. In the zone, data can be written for each particular range of the radial direction. In other word, a plurality of trucks can be written to the zones. In the trucks, the data can be written to each particular range of the circumferential direction. In other words, the truck includes a plurality of sectors. Incidentally, the "truck" is used to indicate an area of a plurality of areas obtained by classifying the disk 10 into particular ranges in the radial direction, a path of the head 15 at a particular radial position of the disk 10, data extending in a circumferential direction and a particular radial direction of the disk 10, data for one lap written to a particular truck of the disk 10, data written to a particular truck of the disk 10 and other various meanings. The "sector" is used to indicate an area of a plurality of areas obtained by classifying a particular truck of the disk 10 in the circumferential direction, data written to a particular circumferential position at a particular radial position of the disk 10, data written to a particular sector of the disk 10, and other various meanings.

The head 15 comprises a slider as a main body, and comprises a write head 15W and a read head 15R that are mounted on the slider. The write head 15W writes data to the disk 10. The read head 15R reads data recorded in the track on the disk 10. The head 15 writes to the disk 10 data in units of blocks including at least one sector and reads data in units of blocks. The sector is data of the minimum unit of data to be written to the disk 10 or read from the disk 10.

The driver IC 20 controls the drive of the SPM 12 and the VCM 14 under the control of the system controller 130 (more specifically, the MPU 40 to be described later).

The head amplifier IC (preamplifier) 30 comprises a read amplifier and a write driver. The read amplifier amplifies a read signal read from the disk 10 and outputs the amplified read signal to the system controller 130 (more specifically, the read/write (R/W) channel 40 to be described later). The write driver outputs, to the head 15, a write current corresponding to the write data output from the R/W channel 50.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Incidentally, the buffer memory 90 may be integrated with the volatile memory 70. The buffer memory 90 is, for example, a DRAM, a static random access memory (SRAM), an SDRAM, a ferroelectric random access memory (FeRAM), a magnetoresistive random access memory (MRAM), and the like.

The system controller (controller) 130 is realized by, for example, using a large scale integrated circuit (LSI) referred to as a system-on-a-chip (SoC) in which a plurality of elements are integrated on a single chip. The system controller 130 includes a microprocessor (MPU) 40, a read/write (R/W) channel 50, a hard disk controller (HDC) 60 and the like. The MPU 40, the R/W channel 50, and the HDC 60 are electrically connected to each other. The system controller 130 is electrically connected to, for example, the driver IC 20, the head amplifier IC 30, the volatile memory 70, the nonvolatile memory 80, the buffer memory 90, the host 100, and the like.

The MPU 40 is a main controller that controls each unit of the magnetic disk device 1. The MPU 40 controls the VCM 14 via the driver IC 20 and executes servo control for positioning the head 15. The MPU 40 controls the SPM 12 via the driver IC 20 to rotate the disk 10. In addition, the MPU 40 controls the operation of writing the data to the disk 10 and selects a storage destination of the data transferred from the host 100, for example, write data. The MPU 40 controls the operation of reading the data from the disk 10 and controls the processing of the data transferred from the disk 10 to the host 100. In addition, the MPU 40 manages the area where the data are recorded. The MPU 40 executes the processing based on firmware. Incidentally, the MPU 40 may execute the processing based on circuitry. The MPU 40 is connected to each unit of the magnetic disk device 1. The MPU 40 is electrically connected to, for example, the driver IC 20, the R/W channel 50, the HDC 60, and the like.

The R/W channel 50 executes signal processing of the data transferred from the disk 10 to the host 100 (hereinafter often referred to as read data) and the data transferred from the host 100 (hereinafter often referred to as write data) in accordance with instructions from the MPU 40. The R/W channel 50 comprises a circuit or function of modulating the write data. The R/W channel 50 comprises a circuit or function of measuring the signal quality of the read data. The R/W channel 50 is electrically connected to, for example, the head amplifier IC 30, the MPU 60, the HDC 60, and the like.

The HDC 60 controls transfer of the data in accordance with instructions from the MPU 40. For example, the HDC 60 controls transfer of the data between the host 100 and the disk 10 in accordance with instructions from the MPU 40. The HDC 60 is electrically connected to, for example, the MPU 40, the R/W channel 50, the volatile memory 70, the nonvolatile memory 80, the buffer memory 90, the host 100, and the like.

The HDC 60 manages a key generation (or referred to as a cryptographic key generation) of a cryptographic key managed (acquired, generated, erased [discarded] and saved) by the host 100 to be described below. The HDC 60 encrypts or decrypts particular data by the cryptographic key managed by the host 100. The HDC 60 saves the key generation of the data encrypted or decrypted with the cryptographic key managed by the host 100, as a table, in a particular nonvolatile recording area. The HDC 60 cannot manage (acquire, generate, discard [erase], and save) the cryptographic key.

The host 100 manages (acquires, generates, discards [erases], and saves) the cryptographic key. The host 100 saves a cryptographic key of a particular key generation and information (hereinafter often referred to as LBA information) associated with logical block address (LBA) corresponding to the cryptographic key. The host 100 acquires the cryptographic key of the particular key generation, and transfers the cryptographic key of the particular key generation and the LBA information corresponding to the cryptographic key to the HDC 60. In addition, the HDC 60 discards (erases) the cryptographic key of the particular key generation and the LBA information corresponding to the cryptographic key.

FIG. 2 is block diagram showing configuration examples of the HDC 60 and the host 100 according to the embodiments.

The host 100 comprises a cryptographic key saving circuit 1001, a cryptographic key management circuit 1002, and the like.

The cryptographic key saving circuit 1001 saves a plurality of cryptographic keys and the LBA information corresponding to the plurality of cryptographic keys for each logical block address (LBA). In other words, the cryptographic key saving circuit 1001 saves the plurality of cryptographic keys of the key generation and the LBA information corresponding to the plurality of cryptographic keys for each LBA.

The cryptographic key management circuit 1002 manages (acquires, generates, erases (discards) and saves) the cryptographic keys. The cryptographic key management circuit 1002 acquires the cryptographic keys based on the LBA information of the data from the cryptographic key saving circuit 1001. In other words, the cryptographic key management circuit 1002 acquires the cryptographic key of the particular key generation and the LBA information corresponding to the cryptographic key of the particular key generation, based on the LBA information of the data from the cryptographic key saving circuit 1001. The cryptographic key management circuit 1002 transfers (or transmits) the cryptographic key acquired from the cryptographic key saving circuit 1001 and the LBA information corresponding to cryptographic key to the HDC 60 (for example, an encryption circuit 601 to be described later) of the magnetic disk device 1. The cryptographic key management circuit 1002 transfers information corresponding to index, for example, the LBA range (hereinafter often referred to as LBA range information) and the cryptographic key corresponding to this index, for example, the LBA range to the HDC 60 (more specifically, the encryption circuit 601 to be described below) after the power supply of the magnetic disk device 1 is changed from turning off to turning on, authentication of the host 100 and the magnetic disk device 1 is executed, and the authentication of the host 100 and the magnetic disk device 1 is acquired. The LBA range information may be included in, for example, the LBA information. The cryptographic key management circuit 1002 erases (discards) the cryptographic key and the LBA information corresponding to the cryptographic key. For example, the cryptographic key management circuit 1002 erases (discards) the cryptographic key of the particular key generation and the LBA information corresponding to the cryptographic key of the particular key generation.

The HDC 60 comprises an encryption circuit 601, a key generation insertion/confirmation circuit 602, a key generation saving circuit 603, a key generation control circuit 604, and the like. Incidentally, the HDC 60 may execute processing of the respective units, for example, the encryption circuit 601, the key generation insertion/confirmation circuit 602, the key generation saving circuit 603, the key generation control circuit 604, and the like on firmware.

The encryption circuit 601 encrypts and decrypts the data by a cryptographic key. The encryption circuit 601 transfers (or transmits) the data corresponding to the particular LBA information encrypted with the cryptographic key of the particular LBA range to the key generation insertion/confirmation circuit 602 and/or the key generation control circuit 604, and the like. In addition, the encryption circuit 601 executes a process (hereinafter simply referred to as a rewrite process) of rewriting the data to designated data. When the power supply is changed from turning off to turning on, the encryption circuit 601 saves index, for example, the LBA range information transferred from the host 100, and the cryptographic key corresponding to this index, for example, the LBA range to the volatile recording area which becomes valid during the transfer, for example, the volatile memory 70.

The key generation insertion/confirmation circuit 602 receives data corresponding to the particular LBA information encrypted with the cryptographic key of the particular LBA range in the encryption circuit 601, adds the key generation of the cryptographic key of the particular LBA range used for the encryption via the key generation control circuit 604 to the data corresponding to the particular LBA information, and writes the data corresponding to this LBA information to which the key generation is added, to a particular area of a recording medium, for example, the disk 10 via the R/W channel 50, the head amplifier IC 30, and the head 15. Incidentally, the recording medium 10 may not be a disk but a nonvolatile memory. When receiving data (read data) having key generation information read from the disk 10, for example, information (hereinafter referred to as keygen_media) associated with the particular area of the written disk 10, the key generation insertion/confirmation circuit 602 transfers the LBA information of the read data to the key generation control circuit 604 and receives the key generation information of the cryptographic key corresponding to the LBA information of the read data, for example, a key generation (keygen) from the key generation control circuit 604. The key generation insertion/confirmation circuit 602 confirms (determines) whether the key generation information corresponding to the LBA range including key generation information corresponding to the LBA information of the read data, for example, keygen and keygen_media match the key generation information corresponding to the LBA range including the LBA information acquired in advance (hereinafter simply referred to as "preliminarily acquired") when encrypting the data corresponding to the LBA information with the cryptographic key corresponding to the LBA range including the LBA information or not. When determining that the key generation information (for example, keygen and keygen_media) corresponding to the LBA range of the read data matches the key generation information corresponding to the LBA range including the preliminarily acquired LBA information, the key generation insertion/confirmation circuit 602 adds to the read data a flag (hereinafter referred to as match flag) indicating that the key generation information corresponding to the LBA range of the read data matches the key generation information corresponding to the LBA range including the preliminarily acquired LBA information, and urges the encryption circuit 601 to execute a decryption process on the read data with the cryptographic key of the key generation corresponding to the LBA range including the LBA information of the read data. When determining that the key generation information (for example, keygen and keygen_media) corresponding to the read data does not match the key generation information corresponding to the LBA range including the preliminarily acquired LBA information, the key generation insertion/confirmation circuit 602 adds to the read data a flag (hereinafter referred to as mismatch flag) indicating that the key generation information corresponding to the LBA range of the read data does not match the key generation information corresponding to the LBA range including the preliminarily acquired LBA information, and urges the encryption circuit 601 to execute a rewrite process on the read data.

The key generation saving circuit 603 saves the index (for example, the LBA range), the key generation confirmation information corresponding to the index (for example, the LBA range), the key generation information corresponding to the index (for example, the LBA range), and the like. The information saved in the key generation saving circuit 603 is saved in the nonvolatile recording area. The key generation saving circuit 603 may be a nonvolatile recording area, for example, the nonvolatile memory 80.

The key generation control circuit 604 controls the key generation of the cryptographic key. The key generation control circuit 604 adds the key generation of the cryptographic key of the particular LBA range used for the encryption to the key generation of the data corresponding to the particular LBA. Based on the LBA information received from the key generation insertion/confirmation circuit 602, the key generation control circuit 604 acquires the key generation information (keygen) of the cryptographic key corresponding to the LBA information from the key generation saving circuit 603 and transfers the acquired key generation information (keygen) of the cryptographic key corresponding to the LBA information to the key generation insertion/confirmation circuit 602.

The key generation control circuit 604 executes management and updating of the key generation of the cryptographic key. The key generation control circuit 604 manages and updates the key generation of this cryptographic key, based on information which is generated by the cryptographic key and which cannot generate, calculate, predict or estimate the cryptographic key. For example, the key generation control circuit manages and updates the key generation of this cryptographic key, based on the key generation confirmation information which is generated by the cryptographic key corresponding to the particular LBA information (for example, LBA) and which cannot generate, calculate, predict or estimate the cryptographic key.

For example, the key generation control circuit 604 encrypts a particular data pattern (hereinafter referred to as a fixed data pattern or a fixed data) transferred from the MPU 60 via the encryption circuit 601 with the cryptographic key corresponding to a particular Index, for example, the LBA range and the particular key generation, and saves a value (hereinafter referred to as a cryptographic data value) of the fixed data encrypted with the cryptographic key corresponding to the particular index, for example, the LBA range and the particular key generation, as the key generation confirmation information, to the key generation saving circuit 603 together with the index, for example, the LBA range and the key generation information (keygen).

For example, when receiving from the host 100 update information indicating that the cryptographic key is updated or changed and the index, for example, the LBA range set to a cryptographic key associated with the update information, the key generation control circuit 604 determines whether the key generation confirmation information, for example, cryptographic data value corresponding to the index, for example, the LBA range set to the cryptographic key associated with the update information is saved in the key generation saving circuit 603 or not. When determining that the key generation confirmation information, for example, cryptographic data value corresponding to the index, for example, the LBA range set to the cryptographic key associated with the update information is not saved in the key generation saving circuit 603, the key generation control circuit 604 newly saves in the key generation saving circuit 603 the key generation confirmation information, for example, cryptographic data value corresponding to the index, for example, the LBA range set to the cryptographic key associated with the update information, and the key generation corresponding to the cryptographic key associated with the update information. When determining that the key generation confirmation information, for example, cryptographic data value corresponding to the index, for example, the LBA range set to the cryptographic key associated with the update information is saved in the key generation saving circuit 603, the key generation control circuit 604 changes or updates the key generation confirmation information, for example, cryptographic data value corresponding to the same LBA range as the index, for example, the LBA range set to the cryptographic key associated with the update information saved in the key generation saving circuit 603, and the key generation of the cryptographic key corresponding to the same LBA range as the index, for example, the LBA range set to the cryptographic key associated with the update information, to the key generation confirmation information, for example, cryptographic data value corresponding to the index, for example, the LBA range set to the cryptographic key associated with the update information, and the key generation corresponding to the cryptographic key associated with the update information.

For example, when receiving from the host 100 the update information and the index, for example, the LBA range set to the cryptographic key associated with the update information, the key generation control circuit 604 acquires from the key generation saving circuit 603 the key generation confirmation information, for example, cryptographic data value corresponding to the same index, for example, the LBA range as the index, for example, the LBA range set to the cryptographic key associated with the update information. The key generation control circuit 604 decrypts the key generation confirmation information, for example, cryptographic data value corresponding to the index, for example, the LBA range set to the cryptographic key associated with the update information acquired from the key generation saving circuit 603, based on the cryptographic key associated with the update information acquired from the host 100, and determines whether the decrypted key generation confirmation information, for example, cryptographic data value (hereinafter referred to as decrypted data) matches the fixed data pattern transferred from the MPU 60 or not. When determining that the decrypted data matches the fixed data pattern, the key generation control circuit 604 does not update the key generation confirmation information, for example, cryptographic data value corresponding to the same index, for example, the LBA range as the index, for example, the LBA range set to the cryptographic key associated with the update information, and the key generation corresponding to the same index, for example, the LBA range as the index, for example, the LBA range set to the cryptographic key of the update information, in the key generation saving circuit 603. When determining that the decrypted data does not match the fixed data pattern, the key generation control circuit 604 changes or updates the key generation confirmation information, for example, cryptographic data value corresponding to the same index, for example, the LBA range as the index, for example, the LBA range set to the cryptographic key associated with the update information, and the key generation corresponding to the same index, for example, the LBA range as the index, for example, the LBA range set to the cryptographic key of the update information, in the key generation saving circuit 603.

A method of updating the key generation will be described below with reference to FIG. 3, FIG. 4, and FIG. 5.

FIG. 3 is a schematic diagram showing an example of the method of updating the key generation of the cryptographic key in the particular LBA range according to the embodiments. In the example shown in FIG. 3, the key generation saving circuit 603 includes a table TB. The table TB includes the LBA ranges, the cryptographic data values corresponding to the LBA ranges, and the key generations of the cryptographic keys corresponding to the LBA ranges. In FIG. 3, the LBA ranges of the table TB include 0 to 100, 101 to 200, 201 to 300, 301 to 400, . . . , and global. The cryptographic data values of the table TB include a cryptographic data value A corresponding to the LBA range 0 to 100, a cryptographic data value B corresponding to the LBA range 101 to 200, a cryptographic data value C corresponding to the LBA range 201 to 300, a cryptographic data value D corresponding to the LBA range 301 to 400, . . . , and a cryptographic data value N corresponding to the LBA range global. The key generations of the table TB include a key generation keygenA of the cryptographic key corresponding to the LBA range 0 to 100, a key generation keygenB of the cryptographic key corresponding to the LBA range 101 to 200, a key generation keygenC of the cryptographic key corresponding to the LBA range 201 to 300, a key generation keygenD of the cryptographic key corresponding to the LBA range 301 to 400, . . . , and a key generation keygenN of the cryptographic key corresponding to the LBA range global.

In the example shown in FIG. 3, when receiving the update information and LBA=110 of the cryptographic key B associated with the update information from the host 100, the HDC 60 acquires the cryptographic data value B corresponding to the LAB range 101 to 200 including LBA=110 set in the cryptographic key B associated with the update information from the table TB of the key generation saving circuit 603. The HDC 60 decrypts the cryptographic data value B acquired from the table TB of the key generation saving circuit 603 to the decrypted data, based on the cryptographic key B associated with the update information acquired from the host 100, and determines whether the decrypted data matches the fixed data pattern transferred from the MPU 40 or not. When determining that the decrypted data matches the fixed data pattern, the HDC 60 does not update the cryptographic data value B corresponding to the LBA range 101 to 200 including LBA=110 set in the cryptographic key B associated with the update information, and the key generation keygenB corresponding to the LBA range 101 to 200 including LBA=110 of the cryptographic key B associated with the update information, in the table TB of the key generation saving circuit 603.

FIG. 4 and FIG. 5 are schematic diagrams showing an example of the method of updating the key generation of the cryptographic of the particular LBA range according to the embodiments. FIG. 4 and FIG. 5 correspond to FIG. 3. In FIG. 5, The cryptographic data values of the table TB include the cryptographic data value A corresponding to the LBA range 0 to 100, a cryptographic data value F corresponding to the LBA range 101 to 200, the cryptographic data value C corresponding to the LBA range 201 to 300, the cryptographic data value D corresponding to the LBA range 301 to 400, . . . , and the cryptographic data value N corresponding to the LBA range global. The key generations of the table TB include the key generation keygenA of the cryptographic key corresponding to the LBA range 0 to 100, a key generation keygenF of the cryptographic key corresponding to the LBA range 101 to 200, the key generation keygenC of the cryptographic key corresponding to the LBA range 201 to 300, the key generation keygenD of the cryptographic key corresponding to the LBA range 301 to 400, . . . , and the key generation keygenN of the cryptographic key corresponding to the LBA range global.

In the example shown in FIG. 4, when receiving the update information and LBA=110 of the cryptographic key F associated with the update information from the host 100, the HDC 60 acquires the cryptographic data value F corresponding to the LAB range 101 to 200 including LBA=110 set in the cryptographic key F associated with the update information from the table TB of the key generation saving circuit 603. The HDC 60 decrypts the cryptographic data value B acquired from the table TB of the key generation saving circuit 603 to the decrypted data, based on the cryptographic key F associated with the update information acquired from the host 100, and determines whether the decrypted data matches the fixed data pattern transferred from the MPU 40 or not.

As shown in FIG. 4 and FIG. 5, when determining that the decrypted data does not match the fixed data pattern, the HDC 60 changes the cryptographic data value B corresponding to the LBA range 101 to 200 including LBA=110 set in the cryptographic key F associated with the update information, and the key generation keygenB corresponding to the LBA range 101 to 200 including LBA=110 of the cryptographic key B associated with the update information, to the cryptographic data value F and the key generation keygenF, in the table TB of the key generation saving circuit 603.

FIG. 6 is a flowchart showing an example of the method of updating the key generation of the cryptographic key according to the embodiments.

The system controller 130 receives the update information and the LBA range or LBA set to the cryptographic key associated with the update information from the host 100 (B601). The system controller 130 acquires the key generation confirmation information corresponding to the same LBA range or LBA as the LBA range or LBA set to the cryptographic key associated with the update information (B602). For example, the system controller 130 acquires the cryptographic data value corresponding to the same LBA range or LBA as the LBA range or LBA set to the cryptographic key associated with the update information. The system controller 130 determines whether a particular value is generated by the cryptographic key corresponding to the particular LBA information and matches the key generation confirmation information that cannot generate, calculate, predict or estimate this cryptographic key or not (B603). For example, the system controller 130 determines whether the fixed data pattern transferred from the MPU 40 matches the decrypted data obtained by decrypting the cryptographic data value corresponding to the same LBA range or LBA as the LBA range or LBA set to the cryptographic key associated with the update information of the table TB of the key generation saving circuit 603 or not.

When determining that the particular value matches the key generation confirmation information (YES in B603), the system controller 130 ends the process. For example, when determining that the fixed data pattern matches the decrypted data, the system controller 130 ends the process without changing the cryptographic data value and the key generation corresponding to the same LBA range or LBA as the LBA range or LBA in which the fixed data pattern transferred from the MPU 40 is set to the cryptographic key associated with the update information of the table TB of the key generation saving circuit 603.

When determining that the particular value does not match the key generation confirmation information (NO in B603), the system controller 130 changes or updates the key generation confirmation information and the key generation corresponding to the same LBA range or LBA as the LBA range or LBA in which the fixed data pattern transferred from the MPU 40 is set to the cryptographic key associated with the update information of the table TB of the key generation saving circuit 603 (B604), and ends the process. For example, when determining that the fixed data pattern does not match the decrypted data, the system controller 130 changes or updates the cryptographic data value and the key generation corresponding to the same LBA range or LBA as the LBA range or LBA in which the fixed data pattern transferred from the MPU 40 is set to the cryptographic key associated with the update information of the table TB of the key generation saving circuit 603, and ends the process.

According to the embodiments, the magnetic disk device 1 receives the update information and the LBA range or LBA set to the cryptographic key associated with the update information, from the host 100. The magnetic disk device 1 acquires the key generation confirmation information corresponding to the same LBA range or LBA as the LBA range or LBA set to the cryptographic key associated with the update information. When determining that the particular value is generated by the cryptographic key corresponding to the particular LBA information and does not match the key generation confirmation information that cannot generate, calculate, predict or estimate this cryptographic key, the magnetic disk device 1 changes the key generation confirmation information and the key generation corresponding to the same LBA range or LBA as the LBA range or LBA in which the fixed data pattern transferred from the MPU 40 is set to the cryptographic key associated with the update information of the table TB of the key generation saving circuit 603. For this reason, the magnetic disk device 1 can execute management and updating of the key generation of the cryptographic key in a method of managing the cryptographic key by the host 100. For this reason, the magnetic disk device 1 can improve the safety.

Next, the magnetic disk device according to modified examples of the above-described embodiments will be described. In the modified examples, the same portions as those of the above-described embodiments are denoted by the same reference numerals and the detailed description thereof will be omitted.

Modified Example 1

The magnetic disk device 1 of modified example 1 is different from magnetic disk device 1 of the above-described embodiments with respect to the method of updating the key generation.

For example, the key generation control circuit 604 generates a hash value of the cryptographic key corresponding to a particular Index, for example, the LBA range and a particular key generation via the encryption circuit 601, and saves the generated hash value as the key generation confirmation information in the key generation saving circuit 603 together with the index, for example, the LBA range and the key generation information (keygen). The key generation control circuit 604 generates a hash value (hereinafter often referred to as a cryptographic key hash value or an update hash value) of the cryptographic key corresponding to the particular index, for example, the LBA range and the particular key generation via the encryption circuit 601, by a hash function, desirably, a cryptographic hash function or one-way hash function such as SHA1/2.

For example, when receiving the update information indicating that the cryptographic key is updated or changed and the index, for example, the LBA range corresponding to the cryptographic key associated with the update information, from the host 100, the key generation control circuit 604 determines whether the key generation confirmation information, for example, cryptographic key hash value corresponding to the index, for example, the LBA range set to the cryptographic key associated with the update information is saved in the key generation saving circuit 603 or not. When determining that the key generation confirmation information, for example, cryptographic key hash value corresponding to the index, for example, the LBA range set to the cryptographic key associated with the update information is not saved in the key generation saving circuit 603, the key generation control circuit 604 newly saves the key generation confirmation information, for example, cryptographic key hash value corresponding to the index, for example, the LBA range set to the cryptographic key associated with the update information, and the key generation corresponding to the cryptographic key associated with the update information, in the key generation saving circuit 603. When determining that the key generation confirmation information, for example, cryptographic key hash value corresponding to the index, for example, the LBA range set to the cryptographic key associated with the update information is saved in the key generation saving circuit 603, the key generation control circuit 604 changes or updates the key generation confirmation information, for example, cryptographic key hash value corresponding to the same LBA range as the index, for example, the LBA range set to the cryptographic key associated with the update information saved in the key generation saving circuit 603, and the key generation of the cryptographic key corresponding to the same LBA range as the index, for example, the LBA range set to the cryptographic key associated with the update information, to the key generation confirmation information, for example, cryptographic key hash value corresponding to the index, for example, the LBA range set to the cryptographic key associated with the update information, and the key generation corresponding to the cryptographic key associated with the update information.

For example, when receiving the update information and the index, for example, the LBA range set to the cryptographic key associated with this update information, from the host 100, the key generation control circuit 604 acquires the key generation confirmation information, for example, hash value corresponding to the same index, for example, LAB range as the index, for example, the LBA range set to the cryptographic key associated with the update information from the key generation saving circuit 603. The key generation control circuit 604 calculates the cryptographic key hash value (updated hash value) by hashing the cryptographic key associated with the update information of the index, for example, the LBA range corresponding to the update information by a hash function. The key generation control circuit 604 determines whether the key generation confirmation information, for example, cryptographic key hash value corresponding to the same index, for example, the LBA range as the index, for example, the LBA range set to the cryptographic key associated with the update information, which is acquired from the key generation saving circuit 603, matches the updated hash value or not. When determining that the key generation confirmation information, for example, cryptographic key hash value corresponding to the index, for example, the LBA range set to the cryptographic key associated with the update information, which is acquired from the key generation saving circuit 603, matches the updated hash value, the key generation control circuit 604 does not update the key generation confirmation information, for example, cryptographic key hash value corresponding to the same index, for example, the LBA range as the index, for example, the LBA range set to the cryptographic key associated with the update information, and the key generation corresponding to the same index, for example, the LBA range as the index, for example, the LBA range set to the cryptographic key associated with the update information, in the key generation save circuitry 603. When determining that the key generation confirmation information, for example, cryptographic key hash value corresponding to the index, for example, the LBA range set to the cryptographic key associated with the update information, which is acquired from the key generation saving circuit 603, does not match the updated hash value, the key generation control circuit 604 changes or updates the key generation confirmation information, for example, cryptographic data value corresponding to the same index, for example, the LBA range as the index, for example, the LBA range set to the cryptographic key associated with the update information, and the key generation corresponding to the same index, for example, the LBA range as the index, for example, the LBA range set to the cryptographic key associated with the update information, in the key generation save circuitry 603.

The method of updating the key generation will be described below with reference to FIG. 7, FIG. 8, and FIG. 9.

FIG. 7 is a schematic diagram showing an example of the method of updating the key generation of the cryptographic key in the particular LBA range according to the embodiments. In the example shown in FIG. 7, the key generation saving circuit 603 includes the table TB. The table TB includes the LBA ranges, the cryptographic data values corresponding to the LBA ranges, and the key generations of the cryptographic keys corresponding to the LBA ranges. In FIG. 7, the LBA ranges of the table TB include 0 to 100, 101 to 200, 201 to 300, 301 to 400, . . . , and global. The cryptographic key hash values of the table TB include a cryptographic key hash value hash value A corresponding to the LBA range 0 to 100, a cryptographic key hash value hash value B corresponding to the LBA range 101 to 200, a cryptographic key hash value hash value C corresponding to the LBA range 201 to 300, a cryptographic key hash value hash value D corresponding to the LBA range 301 to 400, . . . , and a cryptographic hash value hash value N corresponding to the LBA range global. The key generations of the table TB include a key generation keygenA of the cryptographic key corresponding to the LBA range 0 to 100, a key generation keygenB of the cryptographic key corresponding to the LBA range 101 to 200, a key generation keygenC of the cryptographic key corresponding to the LBA range 201 to 300, a key generation keygenD of the cryptographic key corresponding to the LBA range 301 to 400, . . . , and a key generation keygenN of the cryptographic key corresponding to the LBA range global.

In the example shown in FIG. 7, when receiving the update information and LBA=110 of the cryptographic key B associated with the update information from the host 100, the HDC 60 acquires the cryptographic hash value hash value B corresponding to the LAB range 101 to 200 including LBA=110 of the cryptographic key B associated with the update information from the table TB of the key generation saving circuit 603. The HDC 60 calculates the updated hash value hash value B by hashing the cryptographic key B of LBA=110 corresponding to the update information by a hash function. The HDC 60 determines whether the cryptographic key hash value hash value B corresponding to the LBA range 101 to 200 including LBA=110 of the cryptographic key B associated with the update information, which is acquired from the key generation saving circuit 603, matches the updated hash value hash value B or not. When determining that the cryptographic key hash value hash value B corresponding to the LBA range 101 to 200 including LBA=110 of the cryptographic key B associated with the update information matches the updated hash value hash value B, the HDC 60 does not update the cryptographic data value B corresponding to the LBA range 101 to 200 including LBA=110 set in the cryptographic key B associated with the update information, and the key generation keygenB corresponding to the LBA range 101 to 200 including LBA=110 of the cryptographic key B associated with the update information, in the table TB of the key generation saving circuit 603.

Figure 8:
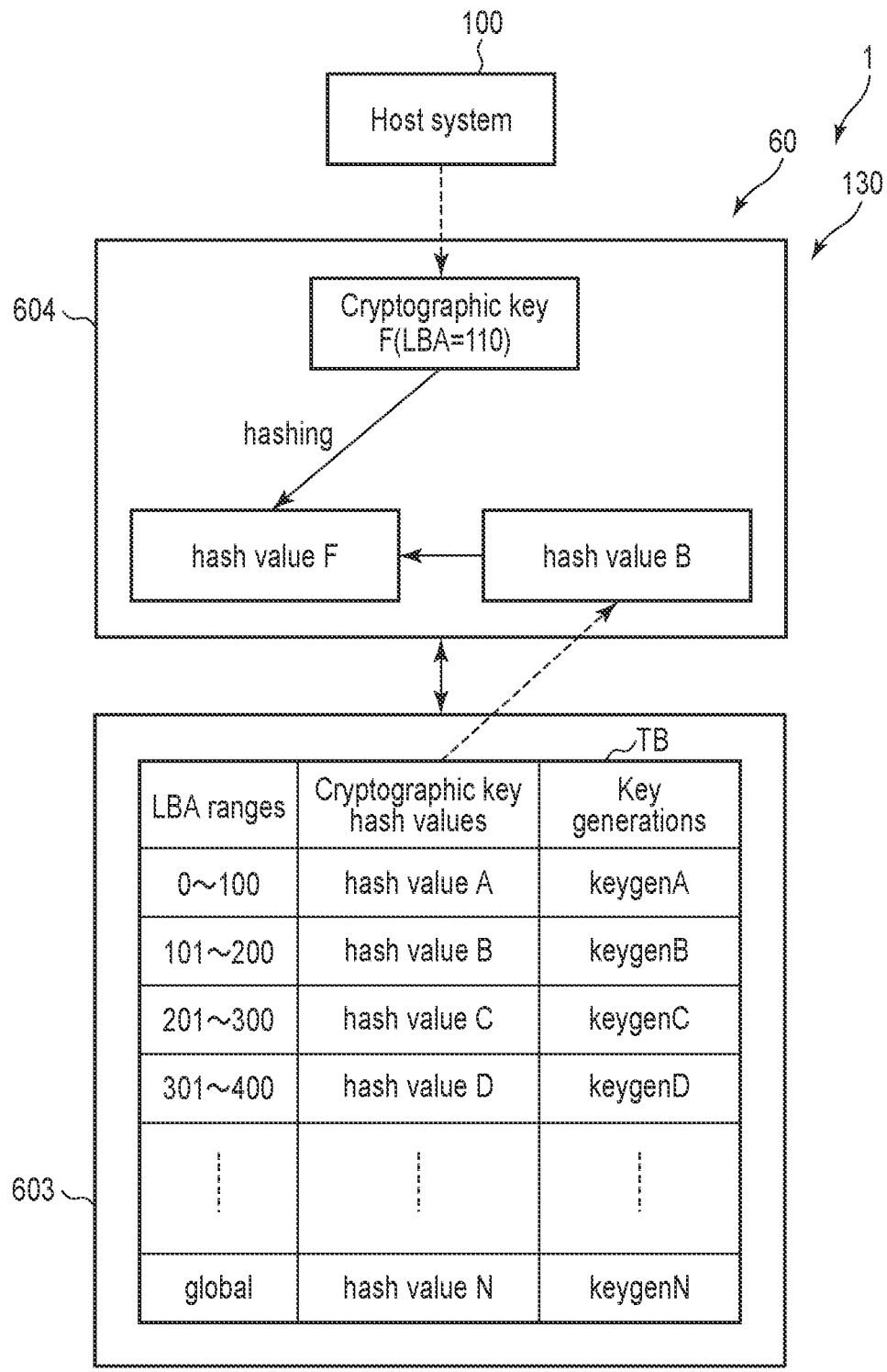
FIG. 8 is a schematic diagram showing an example of the method of updating the key generation of the cryptographic key in the particular LBA range according to the embodiments.
Figure 9:
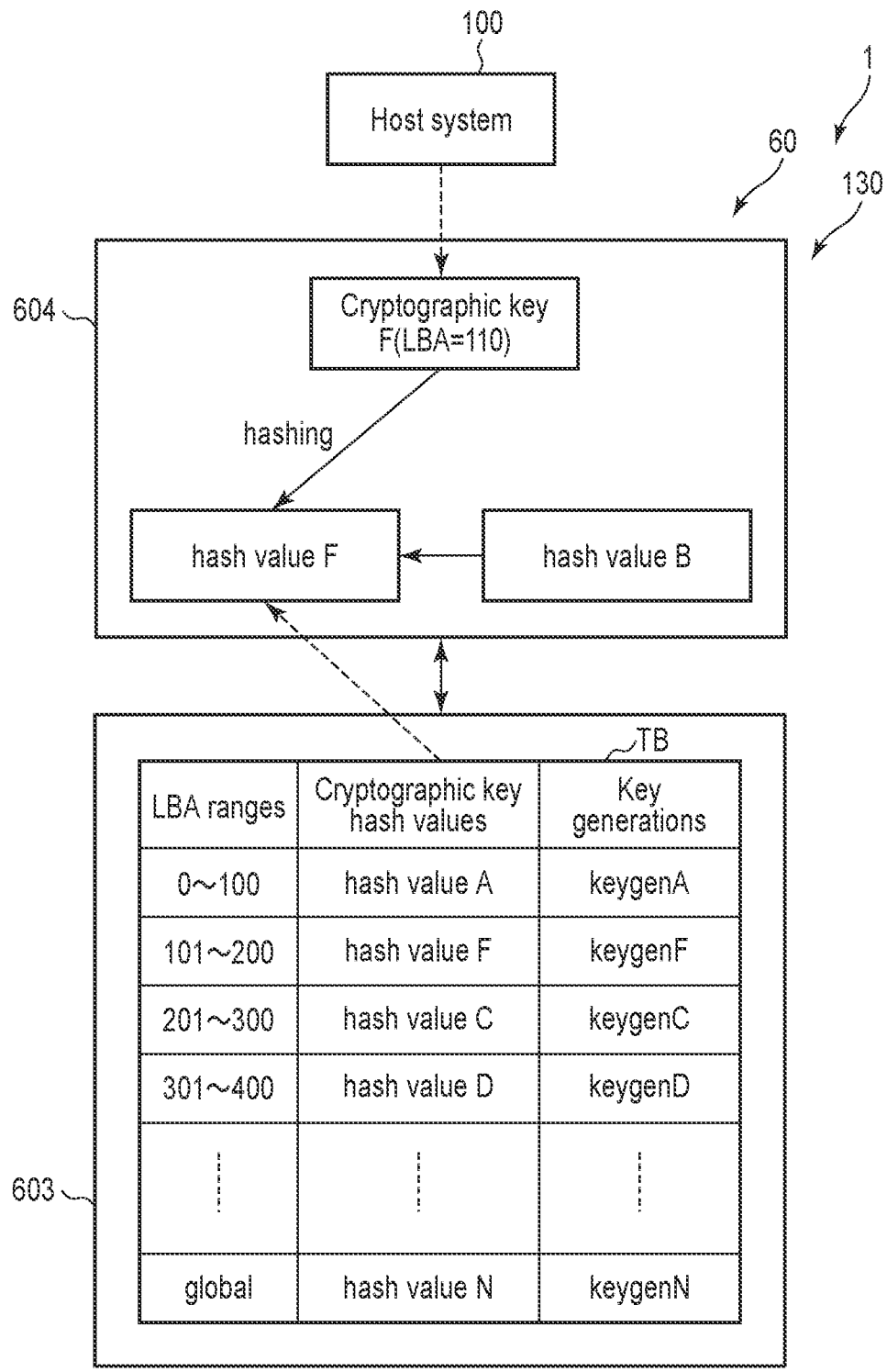
FIG. 9 is a schematic diagram showing an example of the method of updating the key generation of the cryptographic key in the particular LBA range according to the embodiments.

FIG. 8 and FIG. 9 are schematic diagrams showing an example of the method of updating the key generation of the cryptographic of the particular LBA range according to the embodiments. FIG. 8 and FIG. 9 correspond to FIG. 7. In FIG. 9, the cryptographic key hash values of the table TB include the cryptographic key hash value hash value A corresponding to the LBA range 0 to 100, a cryptographic key hash value hash value F corresponding to the LBA range 101 to 200, the cryptographic key hash value hash value C corresponding to the LBA range 201 to 300, the cryptographic key hash value hash value D corresponding to the LBA range 301 to 400, . . . , and the cryptographic hash value hash value N corresponding to the LBA range global. The key generations of the table TB include the key generation keygenA of the cryptographic key corresponding to the LBA range 0 to 100, a key generation keygenF of the cryptographic key corresponding to the LBA range 101 to 200, the key generation keygenC of the cryptographic key corresponding to the LBA range 201 to 300, the key generation keygenD of the cryptographic key corresponding to the LBA range 301 to 400, . . . , and the key generation keygenN of the cryptographic key corresponding to the LBA range global.

In the example shown in FIG. 8, when receiving the update information and LBA=110 of the cryptographic key F associated with the update information from the host 100, the HDC 60 acquires the cryptographic hash value hash value F corresponding to the LAB range 101 to 200 including LBA=110 of the cryptographic key F associated with the update information from the table TB of the key generation saving circuit 603. The HDC 60 calculates the updated hash value hash value F by hashing the cryptographic key F of LBA=110 corresponding to the update information by a hash function. The HDC 60 determines whether the cryptographic key hash value hash value F corresponding to the LBA range 101 to 200 including LBA=110 of the cryptographic key B associated with the update information, which is acquired from the key generation saving circuit 603, matches the updated hash value hash value F or not.

As shown in FIG. 8 and FIG. 9, when determining that the cryptographic key hash value hash value B corresponding to the LBA range 101 to 200 including LBA=110 of the cryptographic key F associated with the update information does not match the updated hash value hash value F, the HDC 60 changes or updates the cryptographic data value B corresponding to the LBA range 101 to 200 including LBA=110 set in the cryptographic key F associated with the update information, and the key generation keygenB corresponding to the LBA range 101 to 200 including LBA=110 of the cryptographic key F associated with the update information, to the cryptographic key hash value hash value F corresponding to the LBA range 101 to 200 including LBA=110 set to the cryptographic key F associated with the update information, and the key generation keygenF corresponding to the LBA range 101 to 200 including LBA=110 of the cryptographic key F associated with the update information, in the table TB of the key generation saving circuit 603.

According to modified example 1, the magnetic disk device 1 receives the update information and the LBA range or LBA set to the cryptographic key associated with the update information, from the host 100. The magnetic disk device 1 acquires the key generation confirmation information corresponding to the same LBA range or LBA as the LBA range or LBA set to the cryptographic key associated with the update information. When determining that the particular value is generated by the cryptographic key corresponding to the particular LBA information and does not match the key generation confirmation information that cannot generate, calculate, predict or estimate this cryptographic key, the magnetic disk device 1 changes the key generation confirmation information and the key generation corresponding to the same LBA range or LBA as the LBA range or LBA in which the fixed data pattern transferred from the MPU 40 is set to the cryptographic key associated with the update information of the table TB of the key generation saving circuit 603. For this reason, the magnetic disk device 1 can execute management and updating of the key generation of the cryptographic key in a method of managing the cryptographic key by the host 100. For this reason, the magnetic disk device 1 can improve the safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the magnetic disk device and the method of updating the key generation of the cryptographic key obtained from the configuration disclosed herein will be described below.

(1)
A magnetic disk device comprising:
a disk;
a head writing data to the disk and reading data from the disk; and
a controller managing a key generation of a cryptographic key, based on generation confirmation information which is generated by the cryptographic key managed by an external device and transferred from the external device, and which is unable to generate the cryptographic key.

(2)
The magnetic disk device of (1), wherein
the controller comprises a table including an LBA range, the generation confirmation information corresponding to the LBA range, and the key generation corresponding to the LBA range.

(3)
The magnetic disk device of (2), wherein
when receiving first update information indicating that a first cryptographic key of the cryptographic key is updated and a first LBA range set to the first cryptographic key from the external device, the controller compares first information and first data corresponding to the first LBA range in association with the cryptographic key, and
when the first information and the first data do not match, the controller changes first generation confirmation information of the generation confirmation information corresponding to the first LBA range and a first key generation corresponding to the first generation confirmation information, to second generation confirmation information of the generation confirmation information associated with the first cryptographic key and a second key generation associated with the first cryptographic key, respectively, in the table.

(4)
The magnetic disk device of (2), wherein
when receiving first update information indicating that a first cryptographic key of the cryptographic key is updated and a first LBA range set to the first cryptographic key from the external device, the controller compares first information and first data corresponding to the first LBA range in association with the cryptographic key, and
when the first information and the first data match, the controller does not change first generation confirmation information of the generation confirmation information corresponding to the first LBA range and a first key generation corresponding to the first generation confirmation information, in the table.

(5)
The magnetic disk device of (3) or (4), wherein
the generation confirmation information is a value obtained by encrypting a fixed data pattern with the cryptographic key,
the first information is data obtained by decrypting the first generation confirmation information, and
the first data is the fixed data pattern.

(6)
The magnetic disk device of (5), wherein
the controller decrypts the first generation confirmation information with the first cryptographic key and generates the first information.

(7)
The magnetic disk device of (3) or (4), wherein
the generation confirmation information is a hash value,
the first information is a first hash value corresponding to the first generation confirmation information, and
the first data is a second hash value obtained by hashing the first cryptographic key.

(8)
The magnetic disk device of (7), wherein
the controller hashes the first cryptographic key with a hash function and generates the first data.

(9)
The magnetic disk device of (8), wherein
the hash function is a cryptographic hash function or a one-way hash function.

(10)
A method of changing a key generation of a cryptographic key, the method being applied to a magnetic disk device comprising a disk and a head writing data to the disk and reading data from the disk, the method comprising:
managing a key generation of the cryptographic key, based on generation confirmation information which is generated by the cryptographic key managed by an external device and transferred from the external device, and which is unable to generate the cryptographic key.

What is claimed is:
1. A magnetic disk device comprising:
a disk;
a head writing data to the disk and reading data from the disk; and
a controller managing a key generation of a cryptographic key, based on generation confirmation information which is generated by the cryptographic key managed by an external device and transferred from the external device, and which is unable to generate the cryptographic key, wherein the controller comprises a table including an LBA range, the generation confirmation information corresponding to the LBA range, and the key generation corresponding to the LBA range, when receiving first update information indicating that a first cryptographic key of the cryptographic key is updated and a first LBA range set to the first cryptographic key from the external device, the controller compares first information and first data corresponding to the first LBA range in association with the cryptographic key, and when the first information and the first data do not match, the controller changes first generation confirmation information of the generation confirmation information corresponding to the first LBA range and a first key generation corresponding to the first generation confirmation information, to second generation confirmation information of the generation confirmation information associated with the first cryptographic key and a second key generation associated with the first cryptographic key, respectively, in the table.

2. The magnetic disk device of claim 1, wherein
the controller saves a volatile memory by which the first LBA range and the first cryptographic key corresponding to the first LBA range are made valid during the transfer from the external device.

3. The magnetic disk device of claim 1, wherein
when the first information and the first data match, the controller does not change first generation confirmation information of the generation confirmation information corresponding to the first LBA range and the first key generation corresponding to the first generation confirmation information, in the table.

4. The magnetic disk device of claim 1, wherein
the generation confirmation information is a value obtained by encrypting a fixed data pattern with the cryptographic key,
the first information is data obtained by decrypting the first generation confirmation information, and
the first data is the fixed data pattern.

5. The magnetic disk device of claim 4, wherein
the controller decrypts the first generation confirmation information with the first cryptographic key and generates the first information.

6. The magnetic disk device of claim 1, wherein
the generation confirmation information is a hash value,
the first information is a first hash value corresponding to the first generation confirmation information, and
the first data is a second hash value obtained by hashing the first cryptographic key.

7. The magnetic disk device of claim 6, wherein
the controller hashes the first cryptographic key with a hash function and generates the first data.

8. The magnetic disk device of claim 7, wherein
the hash function is a cryptographic hash function or a one-way hash function.

9. A method of changing a key generation of a cryptographic key, the method being applied to a magnetic disk device comprising a disk and a head writing data to the disk and reading data from the disk, the method comprising:
managing a key generation of the cryptographic key, based on generation confirmation information which is generated by the cryptographic key managed by an external device and transferred from the external device, and which is unable to generate the cryptographic key;

comprising a table including an LBA range, the generation confirmation information corresponding to the LBA range, and the key generation corresponding to the LBA range;

when receiving first update information indicating that a first cryptographic key of the cryptographic key is updated and a first LBA range set to the first cryptographic key from the external device, comparing first information and first data corresponding to the first LBA range in association with the cryptographic key; and when the first information and the first data do not match, changing first generation confirmation information of the generation confirmation information corresponding to the first LBA range and a first key generation corresponding to the first generation confirmation information, to second generation confirmation information of the generation confirmation information associated with the first cryptographic key and a second key generation associated with the first cryptographic key, respectively, in the table.

10. The method of claim 9, further comprising:
saving a volatile memory by which the first LBA range and the first cryptographic key corresponding to the first LBA range are made valid during the transfer from the external device.

11. The method of claim 9, further comprising:
when the first information and the first data match, not changing first generation confirmation information of the generation confirmation information corresponding to the first LBA range and the first key generation corresponding to the first generation confirmation information, in the table.

12. The method of claim 9, wherein
the generation confirmation information is a value obtained by encrypting a fixed data pattern with the cryptographic key,
the first information is data obtained by decrypting the first generation confirmation information, and
the first data is the fixed data pattern.

13. The method of claim 12, further comprising:
decrypting the first generation confirmation information with the first cryptographic key and generates the first information.

14. The method of claim 9, wherein
the generation confirmation information is a hash value,
the first information is a first hash value corresponding to the first generation confirmation information, and
the first data is a second hash value obtained by hashing the first cryptographic key.

15. The method of claim 14, further comprising:
hashing the first cryptographic key with a hash function and generates the first data.

16. The method of claim 15, wherein
the hash function is a cryptographic hash function or a one-way hash function.

* * * * *